Patented Oct. 16, 1928.

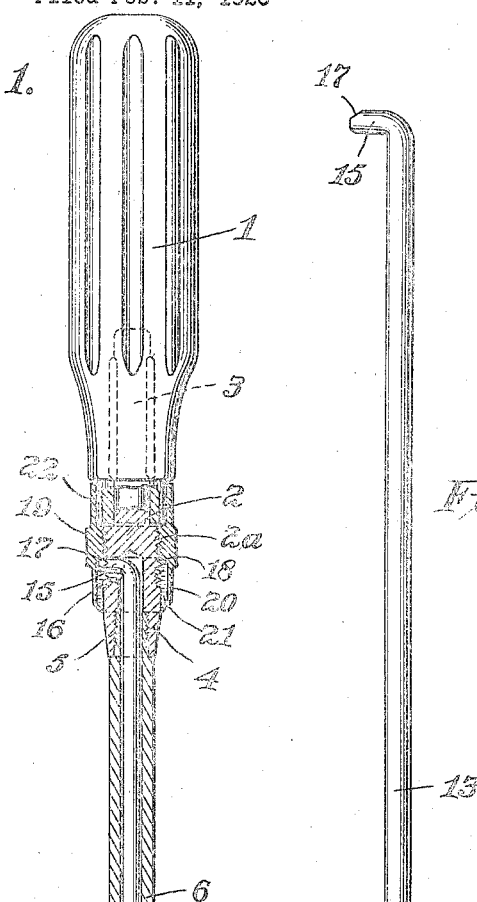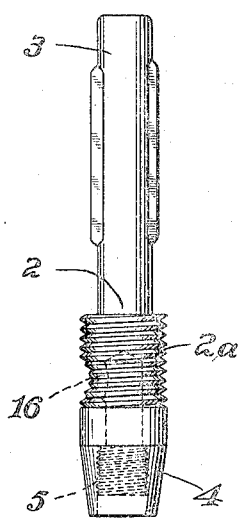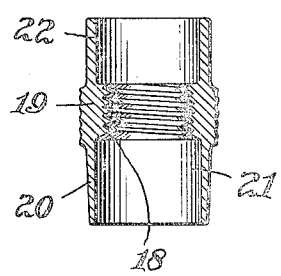

1,688,181

UNITED STATES PATENT OFFICE.

CHARLES F. FINK, OF BALTIMORE, MARYLAND, ASSIGNOR, BY MESNE ASSIGNMENTS, TO COMMONWEALTH BANK OF BALTIMORE, OF BALTIMORE, MARYLAND, A BODY CORPORATE.

SCREW DRIVER.

Application filed February 11, 1926. Serial No. 87,622.

The invention is designed to provide a screw driver having the capacity to hold the screw prior to its insertion or after its removal from its position in the screw threaded member to which it has been applied.

The invention consists in the features and combination and arrangement of parts hereinafter described and particularly pointed out in the claims.

In the accompanying drawings:

Figure 1 represents a central longitudinal section of the screw driver with the handle portion in side elevation.

Fig. 2 is a detail view of the shank member.

Fig. 3 is a detail view of the operating rod, and

Fig. 4 is a detail sectional view of the nut.

In these drawings 1 indicates the handle of the screw driver to which is secured the shank 2 which is composed of a plain cylindrical pin portion 3 fitting a socket in the handle, the shank being screw threaded at 2ª and having an end portion 4 internally screw threaded at 5 to receive the screw threaded end of the tube or casing 6. At the end of this tube or casing the blade member 7 is secured by its reduced extension 8 screw threaded into the end of the tube or casing. The blade member 7 is split part way of its length and its lower portion is beveled at 9 to form two blades which when in normal position have their inner flat surfaces 10 in contact. At the ends of the beveled faces 9 the blades have flat surfaces 11 which are parallel with the longitudinal axis of the screw driver so that when the blade members are in position in the kerf of a screw, the flat terminal faces 11 of the blades will be in firm contact with the walls of the kerf so that the screw will be held by these flat surfaces in order that it may be placed in position to be screwed into the screw threaded opening adapted to receive it, or when unscrewed, may be carried away from the said screw-threaded opening. This gripping effect of the screw driver upon the screw is secured by slightly spreading the blade members away from each other, for which purpose the inner surfaces of these blade members have inclined faces at 12 with which cooperate a spreader member 13 consisting of a rod having its end provided with a conical formation at 14. The spreader member extends through the hollow casing 6 and has a hooked or laterally turned end portion 15 extending through an opening 16 in the hollow shank, which opening communicates with the bore of the shank member and the bore of the casing, the relation of the said laterally extending opening 16 to the said bore being such that the spreader member readily can be inserted into place, as shown in Fig. 1. This hooked or laterally turned end of the spreader member may be slightly beveled at 17 to be borne upon by the annular surface 18 of the nut 19 which is mounted upon the shank at the screw threaded portion 2ª thereof. The nut is provided with a flange 20 which extends over the laterally extending end of the spreader and over the opening 16 in the shank, the edge of this flange making a comparatively close fit with the outer surface of the shank portion 4, so that the space 21 is enclosed and may be filled with a lubricating material in order that the nut and the spreader member may work with ease. The nut is also provided with a rear cylindrical extension 22 which overlies a portion of the handle.

In the use of the implement the ends of the blades 9 are inserted into the kerf of the screw to be carried, removed or placed in position, and upon turning the nut the spreader member is advanced so that the conical end 14 of said member will bear upon the inclined faces on the inner sides of the blades to spread these blades and bring the square surfaces 11 into firm contact with the screw so that this screw may be transported to or from the member from which it is to be removed, or into which it is to be screwed, and in inserting the screw, the screw driver is turned in the ordinary way, and it is also turned in the ordinary way in order to remove the screw from its socket. The relation of the inclined inner faces of the blades to the pointed or conical end of the spreader is such that when the nut is backed off the inclined surfaces 12 of the blades will exert a wedging effect on the conical end of the spreader and retract it, so that the blades may close one upon the other and thus free themselves from gripping contact with the walls of the kerf of the screw. The opening 16 is made large enough to accommodate the necessary movement of the lateral extension or pin of the spreader member in forcing it forward or retracting it.

I claim:

1. In combination in a screw driver, a shank having a bore, a handle connected to one end of said shank, said shank being provided at its other end with a pair of spring blades, blade spreader means mounted in said shank, a nut screw threaded on the shank to operate the spreader means, said nut having a flange enclosing the end of the spreader means with which it engages, and closely fitting the shank and thereby forming a grease cup.

2. In combination in a screw driver, a shank member having a bore and a single laterally facing opening, a handle connected to one end of said shank member, a tubular casing connected to the other end of said shank, a pair of spring blades secured to said casing and having surfaces to grip the walls of the kerf of the screw, a spreader member in said casing comprising a rod having one end turned laterally and projecting through said single opening and the other end being pointed and adapted to spread the blades, and a screw nut threaded on the shank to engage the turned end to advance the spreader.

3. In combination in a screw driver having a pair of spring blades to grip the screw, the spring force of said blades forcing them together, said blades having inclined inner surfaces, a spreader rod having an inclined end for spreading the blades, means for advancing the spreader rod, the relation of the inclines of the blades and spreader, and the value of the spring force of the blades being such that the spring force of the blades will act to entirely retract the spreader when the nut is retracted.

In testimony whereof I affix my signature.

CHARLES F. FINK.